(12) United States Patent
Huang et al.

(10) Patent No.: US 12,665,002 B2
(45) Date of Patent: Jun. 23, 2026

(54) INFORMATION HANDLING SYSTEM DRIVE SYSTEM HAVING AN INTEGRATED HEATING SOLUTION

(71) Applicant: Dell Products L.P., Round Rock, TX (US)

(72) Inventors: Chin-An Huang, Taipei (TW); Eduardo Escamilla, Round Rock, TX (US); James Utz, Georgetown, TX (US); Raymond DeWine Heistand, II, Round Rock, TX (US); Julian Yu-Hao Chen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 18/426,500

(22) Filed: Jan. 30, 2024

(65) Prior Publication Data

US 2025/0246210 A1    Jul. 31, 2025

(51) Int. Cl.
*G11B 33/14*         (2006.01)

(52) U.S. Cl.
CPC .................................. *G11B 33/144* (2013.01)

(58) Field of Classification Search
None
See application file for complete search history.

(56) References Cited

U.S. PATENT DOCUMENTS

| | | | | |
|---|---|---|---|---|
| 6,373,696 | B1 * | 4/2002 | Bolognia | G11B 33/128 |
| 7,203,021 | B1 * | 4/2007 | Ryan | G11B 19/2054 |
| | | | | 360/71 |
| 7,483,269 | B1 * | 1/2009 | Marvin, Jr. | G06F 1/187 |
| | | | | 361/679.31 |
| 7,929,303 | B1 * | 4/2011 | Merrow | H05K 7/20 |
| | | | | 361/679.48 |
| 7,932,734 | B2 * | 4/2011 | Merrow | G11B 33/128 |
| | | | | 361/728 |
| 8,116,079 | B2 * | 2/2012 | Merrow | G11B 33/128 |
| | | | | 361/679.48 |
| 8,547,123 | B2 * | 10/2013 | Merrow | G11B 5/5565 |
| | | | | 361/728 |
| 8,628,239 | B2 * | 1/2014 | Merrow | G11C 29/56016 |
| | | | | 374/4 |
| 9,002,186 | B2 * | 4/2015 | Akers | H05K 7/20145 |
| | | | | 392/432 |
| 9,684,319 | B2 * | 6/2017 | Chiu | G05D 23/1932 |
| 9,756,758 | B2 * | 9/2017 | Song | H05K 7/20 |

(Continued)

FOREIGN PATENT DOCUMENTS

| | | | | | |
|---|---|---|---|---|---|
| PH | 12011502495 | B1 * | 7/2014 | ........... | G01R 1/2619 |
| WO | WO-2011008937 | A2 * | 1/2011 | ........... | G01R 1/2619 |
| WO | WO-2013043786 | A2 * | 3/2013 | ........... | G11B 33/128 |

*Primary Examiner* — William J Klimowicz

(74) *Attorney, Agent, or Firm* — Terrile, Cannatti & Chambers, LLP; Stephen A. Terrile

(57) ABSTRACT

A drive system. The drive system includes a disk drive component; a disk drive carrier; and drive system heating system, the drive system heating system comprising: a heater component, the heater component being mounted internally within the drive system; and, a tray component, the tray component being mounted to the disk drive carrier of the drive system, the tray component supporting the heater component, and wherein the heater component and the tray component are contained within a standard sized drive system.

18 Claims, 7 Drawing Sheets

(56)    References Cited

U.S. PATENT DOCUMENTS

| | | | | | |
|---|---|---|---|---|---|
| 9,829,203 | B2 * | 11/2017 | Yang | .................. | F24D 19/1096 |
| 11,672,101 | B2 * | 6/2023 | Dawkins | ............ | H05K 7/20336 |
| | | | | | 361/710 |
| 11,937,396 | B2 * | 3/2024 | Tunks | .................. | H05K 5/0213 |
| 2005/0092727 | A1 * | 5/2005 | Fraley | .................. | G11B 33/128 |
| 2007/0034368 | A1 * | 2/2007 | Atkins | ................ | G11B 33/144 |
| 2009/0261228 | A1 * | 10/2009 | Merrow | ............... | G11B 33/144 |
| | | | | | 248/550 |
| 2009/0262455 | A1 * | 10/2009 | Merrow | ............... | G11B 33/144 |
| | | | | | 360/97.13 |
| 2009/0265043 | A1 * | 10/2009 | Merrow | ............... | G11B 33/128 |
| | | | | | 700/299 |
| 2011/0011844 | A1 * | 1/2011 | Merrow | ............... | G11B 33/144 |
| | | | | | 219/385 |
| 2011/0012631 | A1 * | 1/2011 | Merrow | ............... | G11B 33/128 |
| | | | | | 374/45 |
| 2011/0012632 | A1 * | 1/2011 | Merrow | ............... | G11B 5/5565 |
| | | | | | 324/750.03 |
| 2011/0013666 | A1 * | 1/2011 | Merrow | ............... | G11B 33/144 |
| | | | | | 374/E1.001 |
| 2011/0013667 | A1 * | 1/2011 | Merrow | ................. | G01K 1/146 |
| | | | | | 374/E7.004 |
| 2012/0247724 | A1 * | 10/2012 | Warren | ................... | F25D 15/00 |
| | | | | | 165/61 |
| 2015/0237908 | A1 * | 8/2015 | Burkett | ................. | A23B 2/708 |
| | | | | | 99/468 |
| 2020/0233823 | A1 * | 7/2020 | Zhang | ................. | H01R 12/716 |
| 2023/0143361 | A1 * | 5/2023 | Taur | ..................... | H05K 7/2039 |
| | | | | | 361/688 |
| 2024/0377809 | A1 * | 11/2024 | Tunks | ............... | G05B 19/4155 |
| 2025/0056757 | A1 * | 2/2025 | Tunks | ............... | H05K 7/20209 |

* cited by examiner

INFORMATION HANDLING SYSTEM DRIVE SYSTEM HAVING AN INTEGRATED HEATING SOLUTION

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing an information handling system drive system with an integrated heating solution.

In one embodiment, the invention relates to a drive system heating system comprising a heater component, the heater component being mounted internally within the drive system; and, a tray component, the tray component being mounted to the disk drive carrier of the drive system, the tray component supporting the heater component, and wherein the heater component and the tray component are contained within a standard sized drive system.

In another embodiment, the invention relates to a drive system comprising a disk drive component; a disk drive carrier; and drive system heating system, the drive system heating system comprising: a heater component, the heater component being mounted internally within the drive system; and, a tray component, the tray component being mounted to the disk drive carrier of the drive system, the tray component supporting the heater component, and wherein the heater component and the tray component are contained within a standard sized drive system.

In another embodiment, the invention relates to a system comprising: a processor; a data bus coupled to the processor; and, drive system comprising: a disk drive component; a disk drive carrier; and drive system heating system, the drive system heating system comprising: a heater component, the heater component being mounted internally within the drive system; and, a tray component, the tray component being mounted to the disk drive carrier of the drive system, the tray component supporting the heater component, and wherein the heater component and the tray component are contained within a standard sized drive system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
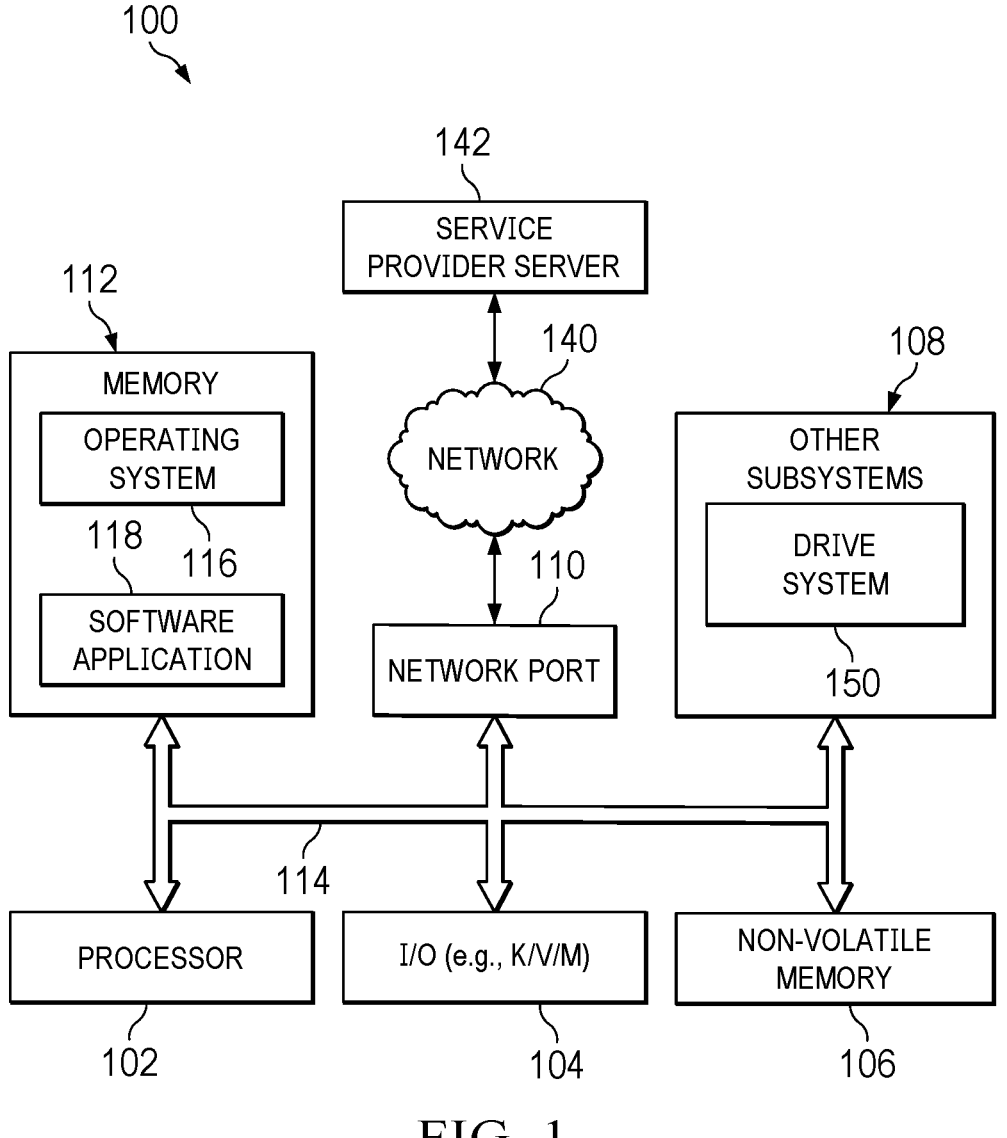
FIG. 1 shows a general illustration of components of an information handling system as implemented in the system and method of the present invention.

Various aspects of the disclosure include an appreciation that it is known to provide information handling systems with devices which conform to specifications defined by an open compute project (OCP) foundation. Various aspects of the disclosure include an appreciation that the open compute project (OCP) foundation has also defined a plurality of additional specifications some of which are within a data-center modular hardware system (DC-MHS) family of specifications. Various aspects of the present disclosure include an appreciation that one such additional specification is the partial width, density optimized host processor module (HPM) form factor (referred to as an M-DNO form factor) base specification.

Various aspects of the disclosure include an appreciation that certain types of data center customers deploy data center facilities at geographically diverse locations. Often these data center facilities are protected from direct outdoor weather but have minimal heating or cooling capabilities. As such, it would be desirable to provide server type information handling systems within these data centers to operate in an environment which has a potentially wide temperature range (e.g., a −40° C. to 65° C. temperature). Various aspects of the present disclosure include an appreciation that many server type information handling systems are typically designed to function in an environment with a narrower temperature range (e.g., a 10° C. to 35° C.) temperature range). Various aspects of the disclosure include an appreciation that many components of server type information handling systems fail in environments which have temperature ranges below 0° C. Various aspects of the present disclosure include an appreciation that servers intended for deployment in wider temperature ranges may either be fully designed with expensive components that can handle both extreme low and extreme high temperatures or be designed with cheaper standard components that are not required to function outside their normal operating temperature window. Various aspects of the present disclosure include a appreciation that it would be desirable to design servers using cheaper standard components that are not required to function outside their normal operating temperature window but that could be deployed in environments having wider temperature ranges.

Various aspects of the present disclosure include an appreciation that a number of heating solutions have been designed to address this issue. For example, certain information handling system have been designed with a heater integrated bezel component which is mechanically attached to a chassis of the information handling system. Additionally, certain information handling systems have been designed with heating elements that are mounted to a circuit board of the information handling system. Additionally, certain information handling systems have been designed with heating elements which are attached to one or more heat sinks of the information handling system.

With information handling systems that have been designed with a heater integrated bezel component, a heating element is mechanically attached to a chassis of the information handling system. With these systems, the heater integrated bezel component includes one or more heating elements which are integrated into a front bezel of the information handling system. Power to the heating elements is cabled either directly from a power supply of the information handling system or by coupling the heating elements to the motherboard of the information handling system. However, challenges associated with a heater integrated bezel component can arise as the cabling for the heating elements in the bezel component can interfere with cabled connections of the information handling system. Additionally, bezel space is always at a premium with server type information handling systems so using some of this space for heating element limits the sue of this area for other functions.

With information handling systems that designed with heating elements that are mounted to a circuit board of the information handling system, heating elements are installed on a rear portion of a motherboard of the information handling system or on a printed circuit card such as a peripheral component interconnect (PCI) card, which is installed in the information handing system. However, challenges associated with can arise as many circuit board vendors will not honor a warranty is other components such as heating elements are attached to their circuit board.

With information handling systems that designed with heating elements that are mounted to a heat sink of an information handling system device. In certain embodiments, the heating elements are physically mounted to a side fin or top portion of the heat sink fins. In many of these systems, the heat sinks are associated with information handing system components such as PCI type components or power supply components. However, challenges associated with mounting heating elements to heat sinks can arise as many device vendors will not honor a warranty is other components such as heating elements are attached to heat sinks of the device. Additionally, the heating elements can require more power to generate an equivalent amount of heat as the heat sinks can dissipate this heat.

A system and method for providing an information handling system drive system with an integrated heating solution. In certain embodiments, the drive system includes an internally mounted heating element. In certain embodiments, the internally mounted heating element is contained within a housing of the drive system.

In certain embodiments, the drive system allows an already available drive system carrier to be reused without needing to be reconfigured. In certain embodiments, the drive system carrier comprises a standard sized hard drive carrier. In certain embodiments, the standard sized hard drive carrier is configured to fit within a plurality of server type information handling system chassis. In certain embodiments the drive system supports standard height drives. In certain embodiments, the standard height drives are substantially 2.5" tall drives. In certain embodiments, the standard height drives are substantially 2.5" tall drives. Accordingly, the compact form factor of the drive system heater assembly advantageously minimizes the larger drive-to-drive pitch spacing that could have been required for the additional drive system layers.

In certain embodiments, the drive system uses a drive system connector system to provide temperature and heating control information to the drive carrier. In certain embodiments, the drive system connector system uses an industry standard connector system to provide the temperature and heating control information. In certain embodiments, the industry standard connector system corresponds to a U.2 Non-Volatile Memory express (NVMe) industry standard connector system (U.2/NVMe) which conforms to an industry standard connector protocol. In certain embodiments, the industry standard protocol covers the physical connector, the electrical characteristics and communication protocols for communicating with a drive system.

In certain embodiments, the drive system connector system passes the temperature and heating control information via a sideband of the drive system connector system. In certain embodiments, the sideband is provided via sideband pins of the device system connector. As used herein, sideband pins broadly refer to pins in the connector that are not directly involved in communicating information with the drive of the drive system. In certain embodiments, the drive system can include serial advanced technology attachment (SATA) based storage components or serial attached small computer system interface (SCS) (SAS)) based storage components. In certain embodiments, a SATA based storage component communicates with an information handling system in which it is mounted via a SATA based drive communications protocol. In certain embodiments, an SAS based storage component communicates with an information handling system in which it is mounted via an SAS based drive communications protocol. In certain embodiments, the storage components can include HDD type storage media, SSD type storage media, or a combination thereof. In certain embodiments, the drive system uses previously unused pins of the NVMe interface. In certain embodiments, the drive system uses industry standard pins of a U.2/NVMe connector interface in a non-standard way. In certain embodiments, the drive system assigns unused pins in a SATA/SAS configuration to carry heater power and sensor signals.

In certain embodiments, the drive system can be installed within an information handling system by a single action, with no secondary connections needing to be made by the end user. In certain embodiments, the drive system includes blind mating connectors. In certain embodiments, the drive system is hot pluggable. Accordingly, the drive system advantageously provides a drive system with an integrated heading element which is automatically connected and is self-contained.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. In various embodiments, one or both the other subsystems 108 or the network port 110 include a drive system 150. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a blade server type information handling system. As used herein, a blade server type information handling system broadly refers to an information handling system which is physically configured to be mounted within a server rack.

In certain embodiments, the drive system 150 includes an internally mounted heating element. In certain embodiments, the internally mounted heating element is contained within a housing of the drive system 150.

In certain embodiments, the drive system 150 allows an already available drive system 150 carrier to be reused without needing to be reconfigured. In certain embodiments, the drive system 150 carrier comprises a standard sized hard drive carrier. In certain embodiments, the standard sized hard drive carrier is configured to fit within a plurality of server type information handling system chassis. In certain embodiments the drive system 150 supports standard height drives. In certain embodiments, the standard height drives are substantially 2.5" tall drives. In certain embodiments, the standard height drives are substantially 2.5" tall drives. Accordingly, the compact form factor of the drive system 150 heater assembly advantageously minimizes the larger drive-to-drive pitch spacing that could have been required for the additional drive system 150 layers.

In certain embodiments, the drive system 150 uses a drive system 150 connector system to provide temperature and heating control information to the drive carrier. In certain embodiments, the drive system 150 connector system uses an industry standard connector system to provide the temperature and heating control information. In certain embodiments, the industry standard connector system corresponds to an industry standard connector system (U.2/NVMe) which conforms to an industry standard connector protocol. In certain embodiments, the industry standard protocol convers the physical connector, the electrical characteristics and communication protocols for communicating with a drive system 150.

In certain embodiments, the drive system 150 connector system passes the temperature and heating control information via a sideband of the drive system 150 connector system. In certain embodiments, the sideband is provided via sideband pins of the device system connector. As used herein, sideband pins broadly refer to pins in the connector that are not directly involved in communicating information with the drive of the drive system 150. In certain embodiments, the drive system 150 can include serial advanced technology attachment (SATA) based storage components or serial attached small computer system interface (SCS) (SAS)) based storage components. In certain embodiments, the storage components can include HDD type storage media, SSD type storage media, or a combination thereof. In certain embodiments, the drive system 150 uses previously unused pins of the NVMe interface. In certain embodiments, the drive system 150 uses industry standard pins of a U.2/NVMe connector interface in a non-standard way. In certain embodiments, the drive system 150 assigns unused pins in a SATA/SAS configuration to carry heater power and sensor signals.

In certain embodiments, the drive system 150 can be installed within an information handling system by a single action, with no secondary connections needing to be made by the end user. In certain embodiments, the drive system 150 includes blind mating connectors. In certain embodiments, the drive system 150 is hot pluggable. Accordingly, the drive system 150 advantageously provides a drive system 150 with an integrated heading element which is automatically connected and is self-contained.

Figure 2:
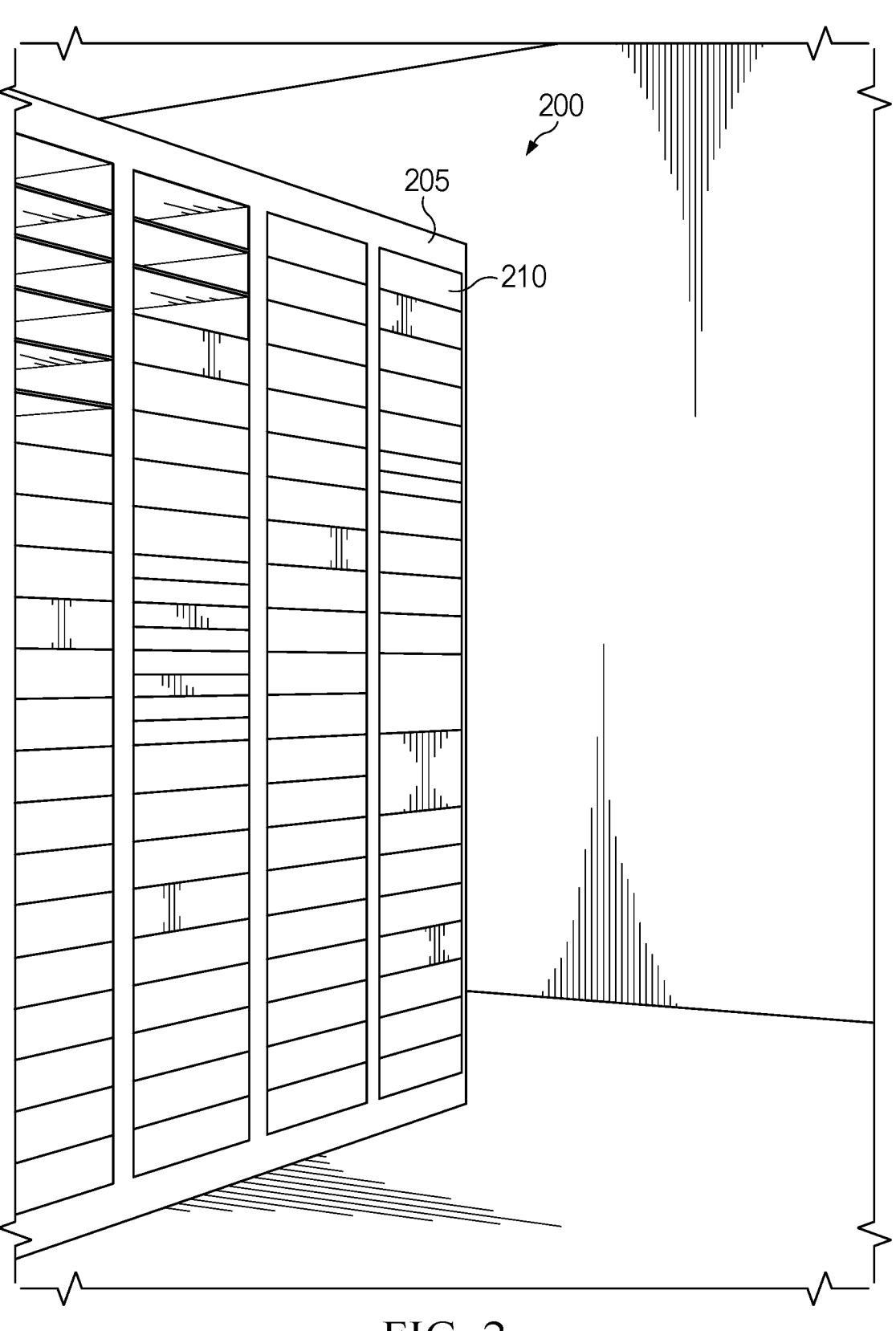
FIG. 2 shows a perspective view of a portion of a data center within an IT environment.

FIG. 2 shows a perspective view of a portion of an IT environment 200. The IT environment 200 includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuously with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1 U rack unit, a 2 U rack unit and a 4 U rack unit. In general, a 1 U rack unit is substantially (i.e., +/−20%) 1.75" high, a 2 U rack unit is substantially (i.e., +/−20%) 3.5" high and a 4 U rack height is substantially (i.e., +/−20%) 7.0" high.

In various embodiments, the IT environment 200 may be deployed at a geographically diverse location. In various embodiments, the IT environment 200 is protected from direct outdoor weather but has minimal heating or cooling capabilities. As such, devices within the IT environment 200 could be exposed to a potentially wide temperature range (e.g., a −40° C. to 65° C. temperature). In certain embodiments, the IT environment includes one or more information handling systems which are designed to function across the potentially wide temperature range. In certain embodiments, the design of these information handling systems include devices which are designed to function across the potentially wide temperature range. In certain embodiments, the devices include devices such as a drive system 150.

Figure 3:
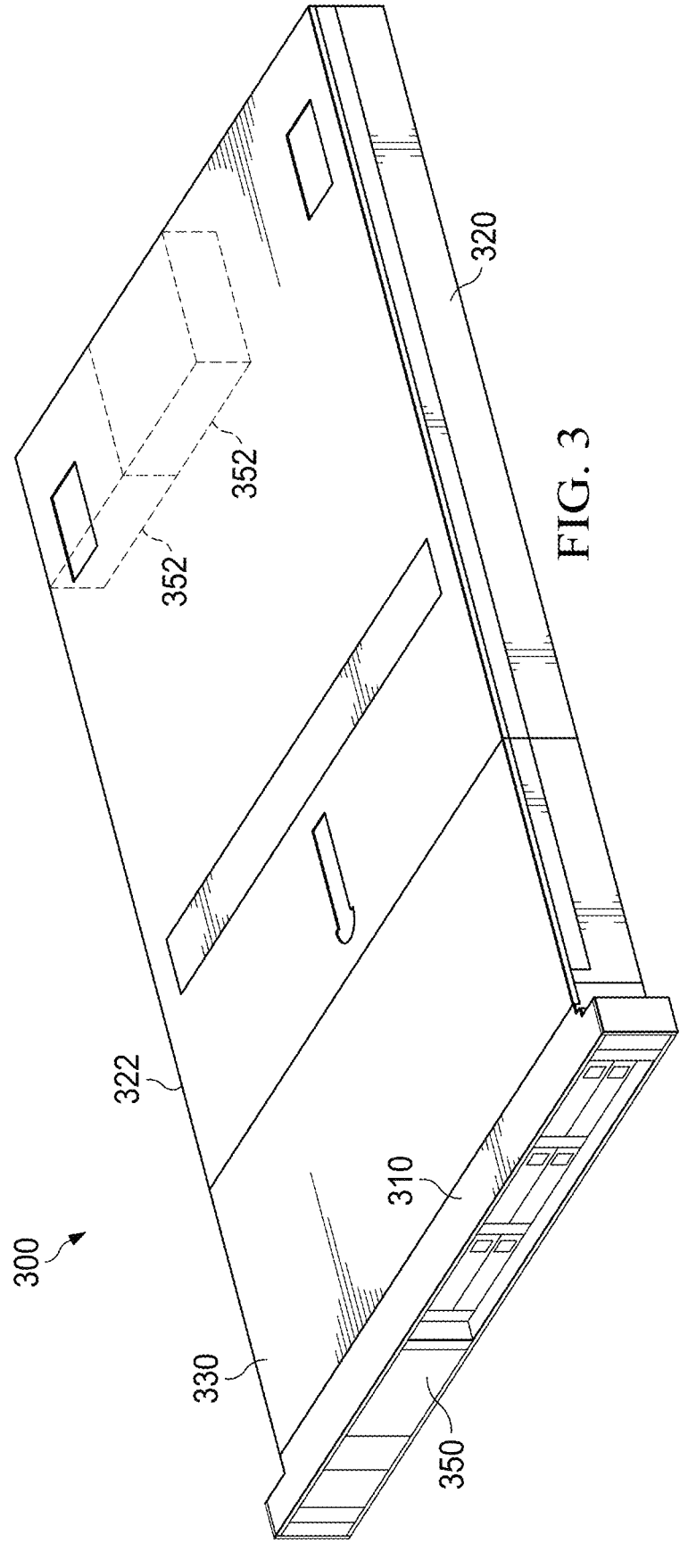
FIG. 3 shows a generalized perspective view of an example server type information handling system.

FIG. 3 shows a generalized perspective view of an example server type information handling system 300. In certain embodiments, the server type information handling system includes a front portion 310, which is accessible when the server type information handing system 300 is mounted on a server rack. In certain embodiments, the side portions 320, 322 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the server type information handling system 300 may be accessed by removing a top panel 330 of the server type information handing system 300. In certain embodiments, the server type information handing system 300 includes one or more front bays 350 via which components may be mounted to the server type information handling system. In certain embodiments, the server type information handing system 300 includes one or more rear bays 352 via which components may be mounted to the server type information handling system. In certain embodiments, the front bays 350, the rear bays 352, or a combination thereof, includes respective drive systems (such as drive system 150). Various aspects of the present disclosure include an appreciation that an information handling system 300 which includes one or more drive systems is therefore designed to function across the potentially wide temperature range.

In certain embodiments, the drive system 150 can be installed within an information handling system 300 by a single action, with no secondary connections needing to be made by the end user. In certain embodiments, the drive system 150 includes blind mating connectors. In certain embodiments, the drive system 150 is hot pluggable. Accordingly, the drive system 150 advantageously provides a drive system 150 with an integrated heating element which is automatically connected and is self-contained.

In certain embodiments, the information handling system includes a component heater manager. The heater manager will monitor the temperature of all the components contained within the information handling system as well as heater contained within components such as the drive system 150. Each component has heating thresholds above which the component needs to operate to boot. The heater elements include safety temperature thresholds. The heater manager controls the heater power to the heater devices as well as information handling system fan speed to ensure that each component is heated as fast as possible while keeping the heat below a safety temperature threshold.

Figure 4A:
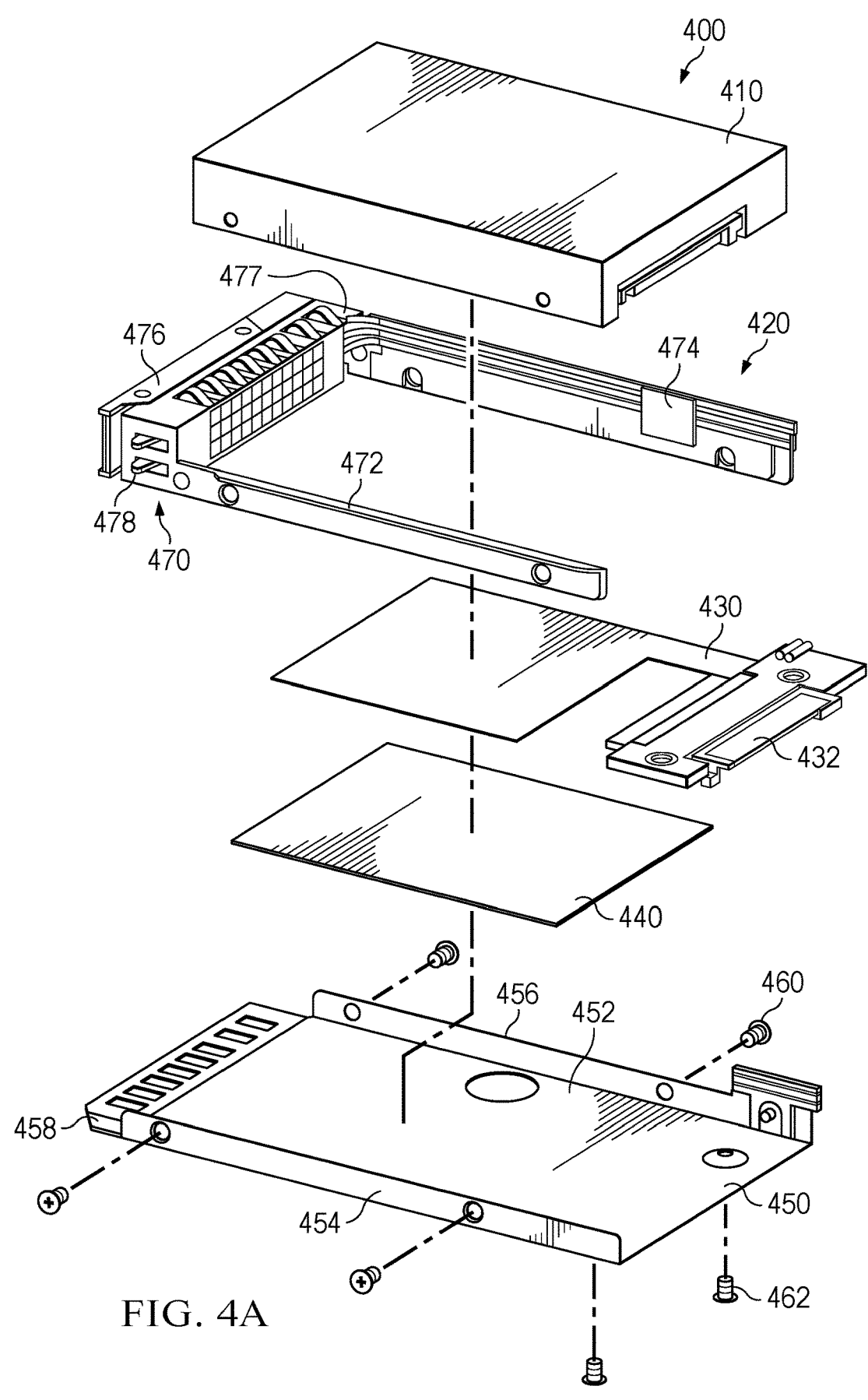
FIGS. 4A and 4B, respectively show an exploded perspective view and a perspective view of a drive system.
Figure 4B:
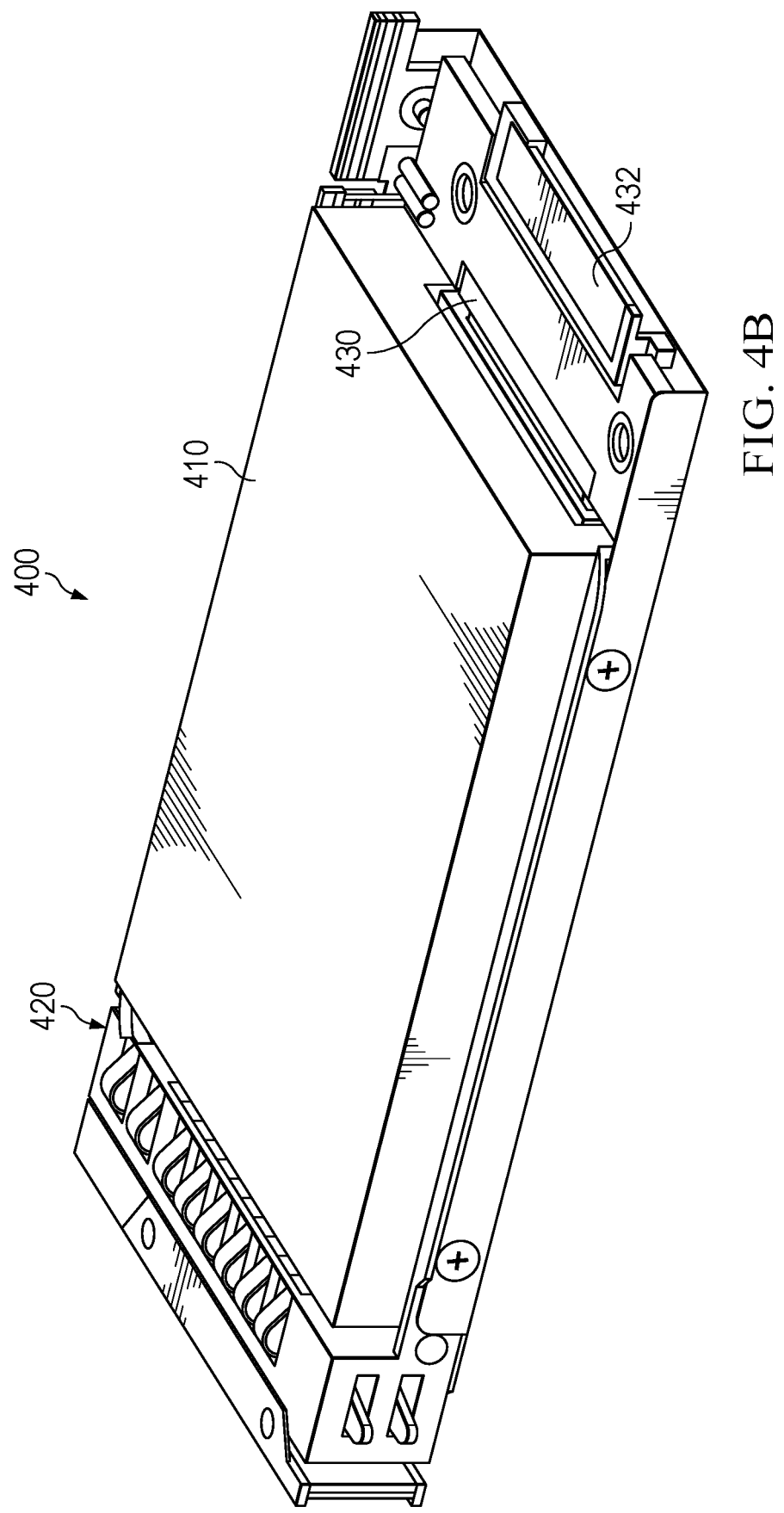

FIGS. 4A and 4B, respectively, show an exploded perspective view and a perspective view of a drive system 400. In certain embodiments, the drive system 400 corresponds to drive system 150. More specifically, in certain embodiments, the drive system 400 includes a disk drive component 410, a disk drive carrier 420, a heater component 430, a drive connector component 432, an insulator component 440, a tray component 450, one or more fasteners 460, 462, or a combination thereof.

In certain embodiments, the disk drive component 410 comprises a standard height disk drive. In certain embodiments, the standard height disk drive is configured to fit within a substantially (i.e., +/−10%) 2.5" tall drive system. In certain embodiments, the standard height disk drive is configured to fit within a substantially (i.e., +/−10%) 3.5" tall drive system. In certain embodiments, the disk drive component 410 is configured with a standard height, depth, width, or a combination thereof. In certain embodiments the standard height, depth and width correspond to one of a plurality of standard form factors. In certain embodiments, the standard form factors include an NVEe form factor, an SAS form factor, an SATA form factor, or a combination thereof. In certain embodiments, the disk drive component 410 comprises a hard disk drive (HDD) type drive system, a solid state driver (SSD) type drive system, or a combination thereof.

In certain embodiments, the disk drive carrier 420 comprises a standard sized hard drive carrier. In certain embodiments, the standard sized hard drive carrier is configured to fit within a plurality of server type information handling system chassis. In certain embodiments, the standard sized hard drive carrier 420 includes a front component 470, a left side component 472, a right side component 474, or a combination thereof. In certain embodiments, front component 470 includes a front bezel portion 476, a ground portion 477, a chassis connector portion 478, or a combination thereof. In certain embodiments, the left side component 472 extends substantially perpendicularly (i.e., +/−20%) from the front component 470. In certain embodiments, the right side component 474 extends substantially perpendicularly (i.e., +/−20%) from the front component 470. In certain embodiments, the front component 470, the left side component 472 and the right side component 474 define a substantially (i.e., +/−20%) U-shaped void into which the disk drive component 410, the heater component 430, the drive connector component 432, the insulator component 440, or a combination thereof, fit. In certain embodiments the disk drive carrier 420 supports standard height drives. In certain embodiments, the standard height drives are substantially 2.5" tall drives. In certain embodiments, the standard height drives are substantially 3.5" tall drives. In certain embodiments, the drive system 150 allows an already available drive system 150 carrier to be reused without needing to be reconfigured.

In certain embodiments, the heater component 430 includes a heating element which is mounted internally within the drive system 400. In certain embodiments the heater component 430 includes a thin film heater device and a sensor device. In certain embodiments, the heater component 430 can further include a thermal pad for thermally coupling the heater component 430 to the disk drive component 410 to provide better thermal conductivity.

In certain embodiments, the drive connector component 432 routes heater power, heater control and sensor signals between the heater component 430 component and the information handling system in which the drive system is mounted. In certain embodiments, the drive connector component 432 includes a connector interposer which is positioned between the disk drive component 410 and an information handling system in which the drive system 400 is mounted. In certain embodiments, the connector interposer routes drive signals from a rear of the disk drive component to the information handling system in which the drive system is mounted. In certain embodiments, the connector interposer routes heater power and sensor signals from the heater component 430 component to the information handling system in which the drive system is mounted.

In certain embodiments, the insulator component 440 includes an insulator pad. In certain embodiments, the insulator pad prevents heat from flowing away from the drive system 400.

In certain embodiments, the tray component 450 is configured to minimally impact standard dimensions associated with the drive system 400. As used herein, minimally impacting standard dimensions associated with the drive system broadly refers to an impact in which dimensions of the drive system still enable the drive system to fit within a standard drive opening of a server type information handling system chassis. In certain embodiments, the tray component 450 is configured to include a base portion 452, a left wall portion 454, a right wall portion 456, or a combination thereof. In certain embodiments, the left wall portion 454 extends substantially perpendicularly (i.e., +/−20%) from the base portion 452. In certain embodiments, the right wall portion 456 extends substantially perpendicularly (i.e., +/−20%) from the base portion 452. In certain embodiments, the base portion 452, the left wall portion 454 and the right wall portion 456 define a substantially (i.e., +/−20%) U-shaped void into which the heater component 430, the drive connector component 432, the insulator component 440, or a combination thereof, fit. In certain embodiments, the tray component 450 is configured as a thin sheet metal tray. In certain embodiments, the tray component may be implemented with additional springs 458 for grounding the tray component to the remainder of the drive system 400. In certain embodiments, the springs function as electro magnetic interference (EMI) grounding springs. In certain embodiments, the springs are electrically coupled to the disk drive carrier 420. In certain embodiments, the tray component 450 supports the heater component 430, the drive connector component 432, the insulator component 440, or a combination thereof. In certain embodiments, the heating element is contained within the tray component 450. In certain embodiments, the heater component 430, the drive connector component 432, the insulator component 440, the tray component 450, or a combination thereof, provide a drive system heater system.

In certain embodiments, the one or more fasteners 460 correspond to a drive system fastener requirements. In certain embodiments each of the one or more fasteners includes a standard 3 mm countersunk screw.

Figure 5:
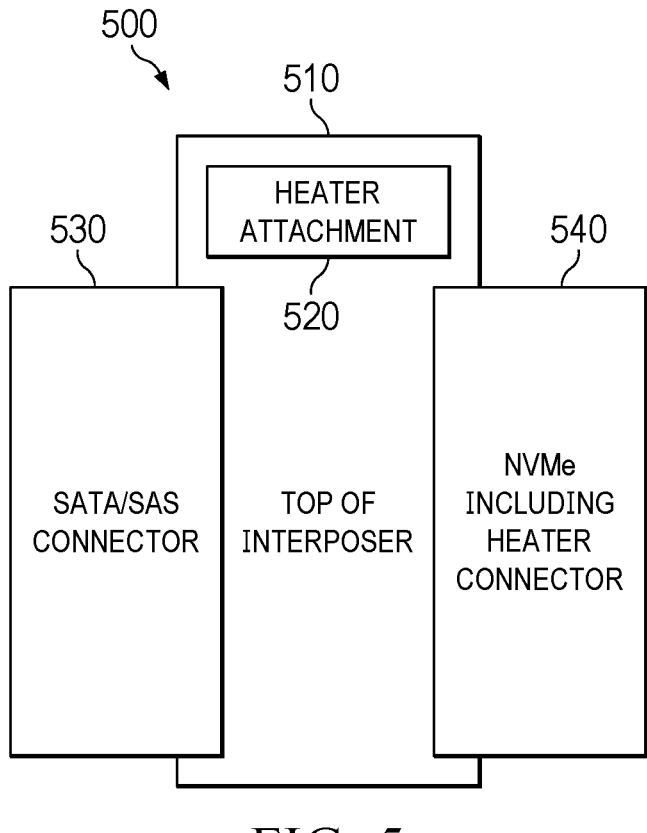
FIG. 5 shows a functional block diagram of the drive system.

FIG. 5 shows a functional block diagram of a connector interposer 500 of a drive system. More specifically, the connector interposer includes an interposer component 510, a heater attachment 520, a drive connector 530, a heater connector 540, or a combination thereof. In certain embodiments, the drive connector 530 is positioned on a drive side of the interposer component 510. In certain embodiments, the heater connector 540 is positioned on a system side of the interposer. In certain embodiments, the drive connector 530 includes an SATA type drive connector, an SAS type drive connector, or a combination thereof. In certain embodiments, the heater connector includes an enhanced NVMe type connector. In certain embodiments, the enhanced NVMe type connector is enhanced to provide power, control and sensor signals to a heater system of the drive system. In certain embodiments the power, control and sensor signals are provided via the heater attachment.

Figure 6A:
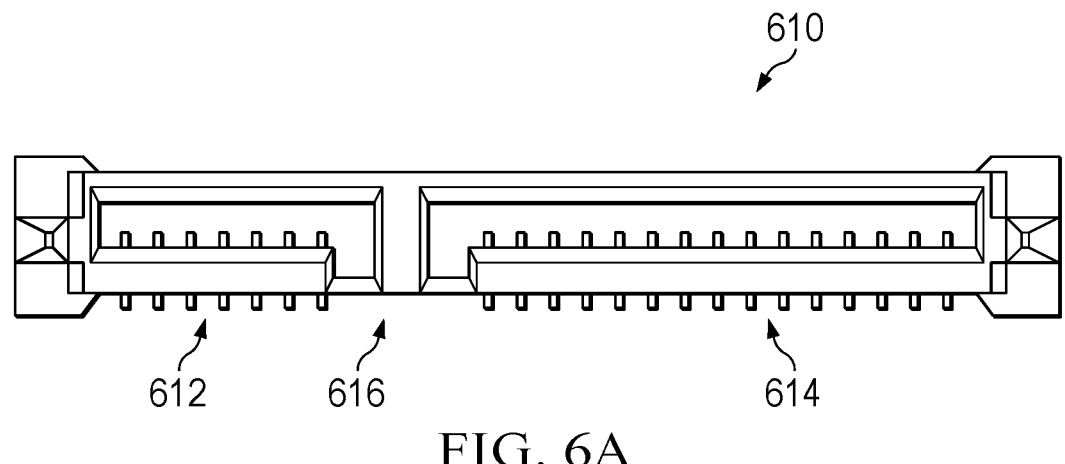
FIGS. 6A, 6B and 6C, show diagrammatic views of a plurality of drive system connectors.
Figure 6B:
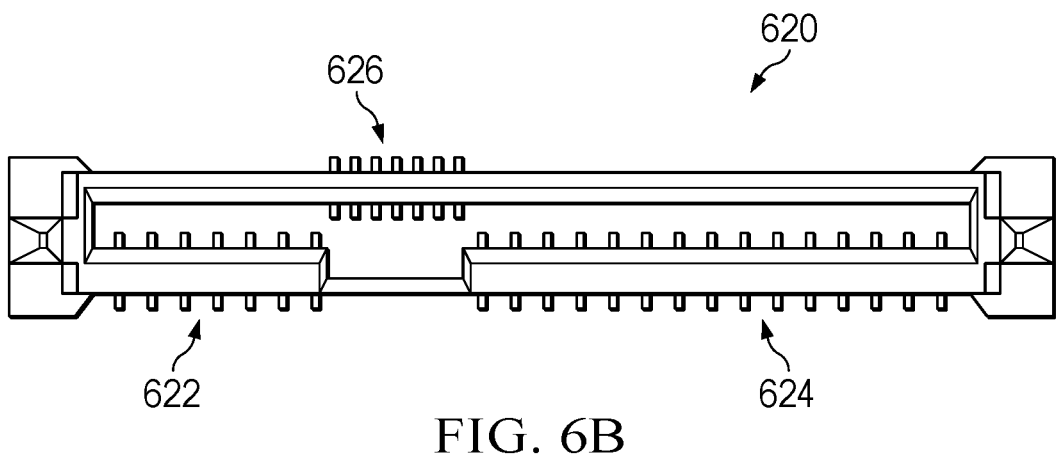
Figure 6C:
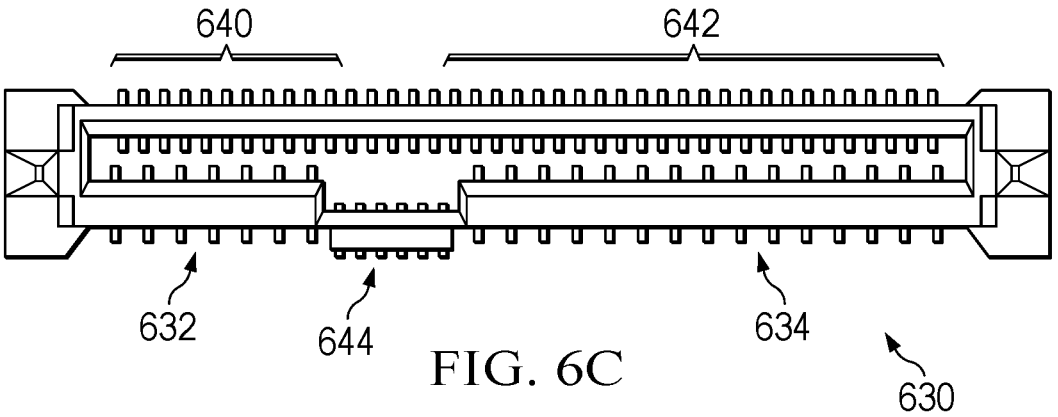

FIGS. 6A, 6B and 6C, show diagrammatic views of a plurality of drive system connectors. In certain embodiments, the plurality of drive system connectors includes an SATA type drive connector 610, an SAS type drive connector 620, a Peripheral Component Interconnect Express (PCIe) type memory connector, a Non-Volatile Memory Express (NVMe) type connector type connector 630 or combination thereof, (PCIe/NVMe). In certain embodiments, the plurality of drive system connectors provides a drive system connector system. In certain embodiments, the drive system connector system corresponds to drive connector component 432.

In certain embodiments, the SATA type connector 610 includes a SATA signal pin portion 612, a power and control pin portion 614 and a key portion 616. In certain embodiments, the SAS type connector 620 includes a signal pin portion 622, a power and control pin portion 624 and a signal pin portion 626. In certain embodiments, the signal pin portion 622 includes SATA type signal pins, SAS port A type signal pins, or a combination thereof. In certain embodiments, the signal pin portion 626 includes SAS port B type signal pins.

In certain embodiments, the PCIe/NVMe type connector 630 includes a signal pin portion 632, a power and control pin portion 634, or a combination thereof. In certain embodiments, the PCIe/NVMe type connector 630 includes a heater control pin portion 640, a heater control portion 642, or a combination thereof. In certain embodiments, the heater control portion 642 transmits reference clock control signals, lane 0 control signals, or a combination thereof. In certain embodiments, the heater control portion 642 transmits reference SMBus control signals, lane 1-3 control signals, dual port enable control signals, or a combination thereof. In certain embodiments, the PCIe/NVMe type connector 630 corresponds to an industry standard connector system (U.2/NVMe) which conforms to an industry standard connector protocol. In certain embodiments, the industry standard protocol covers the physical connector, the electrical characteristics and communication protocols for communicating with a drive system.

In certain embodiments, the drive system connector system passes the temperature and heating control information via a sideband of the drive connector system. In certain embodiments, the sideband is provided via sideband pins of a device system connector. As used herein, sideband pins broadly refer to pins in the connector that are not directly involved in communicating information with the drive of the drive system.

Other embodiments are within the following claims. For example, a server rack could be provided with a smart backplane which detects heat-capable drive system versus a standard drive system. Such a smart backplane could also choose to switch the pins from the heating circuits other needs such as ×4 PCIe lanes are needed. Also for examples, a heat-capable drive system could be configured to function in a heat producing mode of operation or a wider PCIe mode of operation depending on whether the heat function is needed in the particular IT environment. Such an option would enable a performance vs. low temperature support tradeoff in particular server type information handing system designs.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A drive system, comprising:
a disk drive carrier, the disk drive carrier comprising a front component, a left side component and a right side component, the front component, the left side component and the right side component defining a substantially U-shaped void;
a heater component, the heater component being mounted internally within a drive system, the heater component fitting within the substantially U-shaped void of the disk driver carrier; and,
a tray component, the tray component being mounted to the disk drive carrier of the drive system, the tray component including a base portion, a left wall portion and a right wall portion, the tray component supporting the heater component, the heater component extending in a plane horizontally across the base portion of the tray component so as to fit under a disk drive component of the drive system, the tray component being configured to minimally impact standard dimensions associated with the drive system; and wherein
the heater component and the tray component are contained within the drive system.

2. The drive system of claim 1, wherein:
the heater component comprises a thermal pad, the thermal pad thermally coupling the heater component to an underside of the disk drive component of the drive system.

3. The drive system of claim 1, further comprising:
a drive connector component, the drive connector component routing heater power, heater control and sensor signals between the heater component and an information handling system in which the drive system is mounted.

4. The drive system of claim 3, wherein:
the drive connector component comprises a drive connector system, the drive connector system comprising an industry standard connector system, the drive connector component routing heater power, heater control and sensor signals via unassigned pins of the drive connector system when the drive system communicates with the information handling system via a standards based drive communication protocol.

5. The drive system of claim 4, wherein:
the industry standard connector system comprises a Non-Volatile Memory Express (NVMe) type connector system.

6. The drive system of claim 4, wherein:
the standards based drive communication protocol includes at least one of a serial advanced technology attachment (SATA) based drive communication protocol and serial attached small computer system interface (SCS) (SAS) based drive communication protocol.

7. A drive system comprising:
a disk drive component;
a disk drive carrier, the disk drive carrier comprising a front component, a left side component and a right side component, the front component, the left side component and the right side component defining a substantially U-shaped void; and,
a drive system heating system, the drive system heating system comprising:
a heater component, the heater component being mounted internally within the drive system, the heater component fitting within the substantially U-shaped void of the disk driver carrier; and,
a tray component, the tray component being mounted to the disk drive carrier of the drive system, the tray component including a base portion, a left wall portion and a right wall portion, the tray component supporting the heater component, the heater component extending in a plane horizontally across the base portion of the tray component so as to fit under the disk drive component of the drive system, the tray component being configured to minimally impact standard dimensions associated with the drive system; and wherein
the heater component and the tray component are contained within the drive system.

8. The drive system of claim 7, wherein:
the heater component comprises a thermal pad, the thermal pad thermally coupling the heater component to the disk drive component of the drive system.

9. The drive system of claim 7, wherein the drive system heating system further comprises:
a drive connector component, the drive connector component routing heater power, heater control and sensor signals between the heater component and an information handling system in which the drive system is mounted.

10. The drive system of claim 9, wherein:
the drive connector component comprises a drive connector system, the drive connector system comprising an industry standard connector system, the drive connector component routing heater power, heater control and sensor signals via unassigned pins of the drive connector system when the drive system communicates with the information handling system via a standards based drive communication protocol.

11. The drive system of claim 10, wherein:
the industry standard connector system comprises a Non-Volatile Memory Express (NVMe) type connector system.

12. The drive system of claim 10, wherein:
the standards based drive communication protocol includes at least one of a serial advanced technology attachment (SATA) based drive communication protocol and serial attached small computer system interface (SCS) (SAS) based drive communication protocol.

13. A system comprising:

a processor;

a data bus coupled to the processor; and, a drive system comprising:

a disk drive component;

a disk drive carrier, the disk drive carrier comprising a front component, a left side component and a right side component, the front component, the left side component and the right side component defining a substantially U-shaped void; and, a drive system heating system, the drive system heating system comprising:

a heater component, the heater component being mounted internally within the drive system, the heater component fitting within the substantially U-shaped void of the disk driver carrier; and, a tray component, the tray component including a base portion, a left wall portion and a right wall portion, the tray component being mounted to the disk drive carrier of the drive system, the tray component supporting the heater component, the heater component extending in a plane horizontally across the base portion of the tray component so as to fit under the disk drive component of the drive system, the tray component being configured to minimally impact standard dimensions associated with the drive system; and wherein the heater component and the tray component are contained within the drive system.

14. The system of claim 13, wherein:

the heater component comprises a thermal pad, the thermal pad thermally coupling the heater component to the disk drive component of the drive system.

15. The system of claim 13, wherein the drive system heating system further comprises:

a drive connector component, the drive connector component routing heater power, heater control and sensor signals between the heater component and an information handling system in which the drive system is mounted.

16. The system of claim 15, wherein:

the drive connector component comprises a drive connector system, the drive connector system comprising an industry standard connector system, the drive connector component routing heater power, heater control and sensor signals via unassigned pins of the drive connector system when the drive system communicates with the information handling system via a standards based drive communication protocol.

17. The system of claim 16, wherein:

the industry standard connector system comprises a Non-Volatile Memory Express (NVMe) type connector system.

18. The system of claim 16, wherein:

the standards based drive communication protocol includes at least one of a serial advanced technology attachment (SATA) based drive communication protocol and serial attached small computer system interface (SCS) (SAS) based drive communication protocol.

* * * * *